United States Patent [19]

Sederquist et al.

[11] Patent Number: 5,330,857
[45] Date of Patent: Jul. 19, 1994

[54] METHOD OF GENERATING HIGH-PURITY NITROGEN GAS

[75] Inventors: Richard A. Sederquist, Newington; John C. Trocciola, Glastonbury; Paul J. Farris, South Windsor; Murdo J. Smith, II, Bristol, all of Conn.

[73] Assignee: International Fuel Cells Corporation, South Windsor, Conn.

[21] Appl. No.: 125,354

[22] Filed: Sep. 22, 1993

Related U.S. Application Data

[63] Continuation of Ser. No. 785,605, Oct. 30, 1991, abandoned.

[51] Int. Cl.⁵ ............................................. H01M 8/00
[52] U.S. Cl. ...................................... 429/13; 429/22; 429/23; 429/156; 204/59 R; 204/153.14

[56] References Cited

U.S. PATENT DOCUMENTS 3,879,218  4/1975  Kellen et al. ..................... 429/22

FOREIGN PATENT DOCUMENTS 0706471  3/1965  Canada ............................. 429/13

Primary Examiner—Kathryn Gorgos

[57] ABSTRACT

High-purity nitrogen gas is generated by reducing at least the residual oxygen content of at least the cathode exhaust gas stream of a fuel cell device. The oxygen reduction is achieved either by controlling the passage of an oxidant gas through the cathode side of the fuel cell device in such a manner as to increase the oxygen utilization at the cathode side of the fuel cell device relative to the optimum electric power generation operating conditions of the fuel cell device, or by removing most of the residual oxygen from the cathode exhaust gas stream exhausted from the cathode side of the fuel cell device, while maintaining both oxygen and nitrogen contained in the cathode exhaust gas in their gaseous states throughout, or both. Moreover, anode exhaust gas can be reacted in a reformer burner with a reduced amount of excess oxygen and/or the reformer burner exhaust gas can be purified to remove combustion products and/or oxygen therefrom.

3 Claims, 1 Drawing Sheet

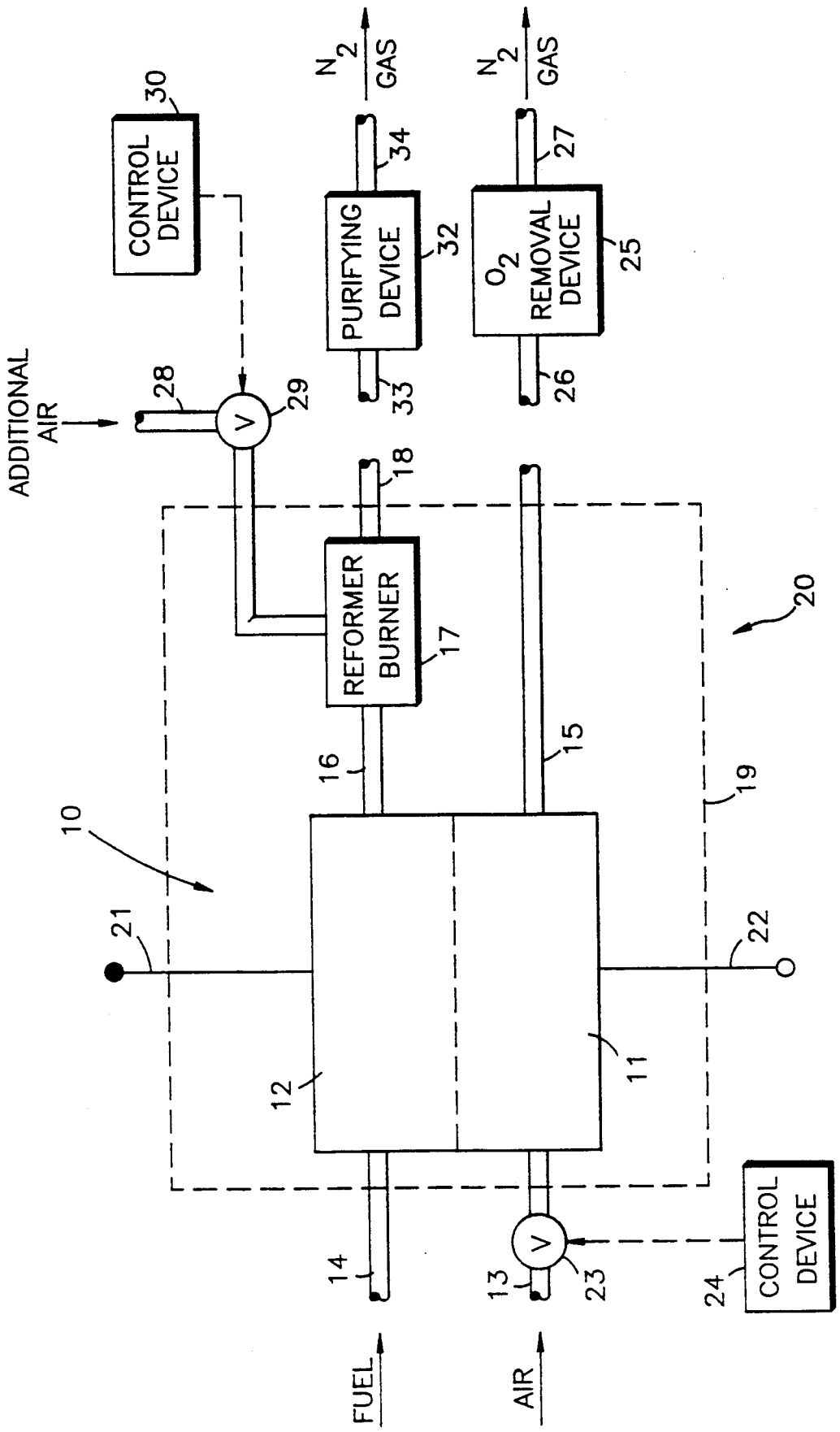

METHOD OF GENERATING HIGH-PURITY NITROGEN GAS

This application is a Continuation of U.S. application Ser. No. 785,605, filed Oct. 30, 1991 now abandoned.

TECHNICAL FIELD

The present invention relates to gas generation and treatment in general, and more particularly to a method of and an apparatus for generating high-purity nitrogen gas.

BACKGROUND ART

Nitrogen is one of the most important industrial gases in the world, second only to oxygen in use. At the present time, nitrogen is generally delivered to the user as substantially pure nitrogen in bulk liquid form. A method that is currently most frequently used for the production of such substantially pure nitrogen is by air liquefaction and fractionation. While this method has the advantage of also simultaneously resulting in the production of high-purity oxygen, it nevertheless has the pronounced disadvantage that it is expensive to perform and energy intensive. Therefore, the cost associated with this method is justifiable only under certain circumstances, such as when is it mandatory that the nitrogen that is to be used in a particular application be substantially pure, when the only practical way of delivering nitrogen from the production facility to the location of use is in its liquid bulk form, and/or when there is a demand for the oxygen that is simultaneously obtained in this operation.

It was already previously attempted to obtain high-purity or even substantially pure nitrogen in various ways other than ambient air liquefaction and fractionation. Thus, for instance, it has been realized that a hydrocarbon air fuel cell device produces a relatively clean nitrogen rich exhaust product. Based on this recognition, it was proposed in commonly assigned U.S. Pat. Nos. 4,767,606 and 4,792,502 to Trocciola et al to combine a fuel cell device of this type with a cryogenic liquefaction and fractionation apparatus in such a manner that such apparatus converts the fuel cell cathode exhaust gas, which contains nitrogen, oxygen and water vapor, into a substantially pure nitrogen product. However, even this process is too expensive, despite the fact that the cathode exhaust gas contains a much lower percentage of oxygen than ambient air, unless the above conditions are present.

On the other hand, it is known from a commonly assigned U.S. Pat. No. 4,751,151 to Healy et al to employ a carbon dioxide absorber in a fuel cell system to recover carbon dioxide from the fuel cell anode exhaust stream (fuel gas) containing principally hydrogen, carbon dioxide, carbon monoxide, and water vapor. However, even this process would be rather uneconomical if it were attempted to use the thus constructed system with a hydrocarbon air fuel cell device, especially since the anode exhaust stream carries only about 20% of the nitrogen passing through such fuel cell device.

Moreover, there are already known various constructions of gas purifying devices, among them such using polymer membranes and the pressure swing absorption approach, for removing unwanted gaseous ingredients from gases, such as oxygen from air, to obtain high-quality nitrogen product. However, even these processes as previously applied to the production of nitrogen from air leave much to be desired in terms of economy of operation and thus cost of the thus obtained high-purity nitrogen.

Accordingly, it is a general object of the present invention to avoid the disadvantages of the prior art.

More particularly, it is an object of the present invention to provide a method of producing high-purity nitrogen gas, which method does not possess the disadvantages of the known methods of this kind.

Still another object of the present invention is so to develop the method of the type here under consideration as to reduce the cost of the high-purity nitrogen obtained by using this method.

It is yet another object of the present invention to devise an apparatus which is suitable for the performance of the method of the above type.

A concomitant object of the present invention is design the apparatus of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a method of generating high-purity nitrogen gas, which method includes the steps of operating a fuel cell device having a cathode side and an anode side, and reducing at least the residual oxygen content of the cathode exhaust gas stream to a level at which the cathode exhaust gas constitutes the high-purity nitrogen gas. The operation of the fuel cell device includes passing an air stream through the cathode side of the fuel cell device, feeding a gaseous fuel stream to the anode side of the fuel cell device, and electrochemically combining oxygen from the air stream in the fuel cell device with fuel from the fuel stream, with attendant formation of a cathode exhaust gas stream containing nitrogen and residual oxygen, and generation of electric power. Moreover, in accordance with the invention, the reducing step includes at least one but advantageously both of the sub-steps of controlling the passing step in such a manner as to increase the oxygen utilization at the cathode side of the fuel cell device, at the cost of reduction in the amount of electric power generated, relative to the optimum electric power generation operating conditions of the fuel cell device, and of removing most of the residual oxygen from the cathode exhaust gas stream exhausted from the cathode side of the fuel cell device, while maintaining both oxygen and nitrogen contained in the cathode exhaust gas in their gaseous states throughout.

Some of the advantages of such a method as described so far is that it utilizes for the production of the high-purity nitrogen gas a gaseous medium that has a lower oxygen content than the ambient air to begin with, while containing only a minimum amount of other substances, if any, constituting contaminants of the nitrogen gas, and that the gaseous medium being used for performing this method is an otherwise discarded by-product of another useful operation; that is, of an electric power generation operation by a fuel cell device. As a result, a degree of purity of the nitrogen gas that is acceptable or sufficient for many applications can be achieved merely by controlling the operation of the fuel cell device in such a manner as to increase the degree of oxygen utilization in the cathode side thereof. Then, if an even higher degree of purity of the resultant nitrogen gas is required, this approach can be combined with a variety of secondary oxygen removal processes that are much less expensive than the aforementioned liquefaction and fractionation process. In the alternative, such secondary oxygen processes can be used by themselves, without controlling or adjusting the fuel cell device operation for maximum achievable oxygen utilization. In either event, the secondary oxygen removal processes will be applied to a gaseous medium having a lower oxygen contents than ambient air and, consequently, their operation is more efficient than if they were used to remove oxygen from ambient air.

Another advantage of this method is that it can easily be used to produce the high-purity nitrogen gas on site, that is, at the location of its intended use, thus avoiding the otherwise existing need for hauling the nitrogen gas from its production facility to such a site. Of course, the fuel to be consumed by the fuel cell device will still have to be available on or brought to the site, but the generation of electric power for use on site or for delivery to an electric network in exchange for revenue more than offsets the cost of this requirement.

In the above context, it is also advantageous to utilize the anode exhaust gas to produce additional high-purity nitrogen. The anode exhaust gas itself does not contain any significant amount or nitrogen; however, it still includes a considerable amount of combustible substances (fuel) that have to be disposed of. For this reason, the anode exhaust gas is usually combusted or reacted with a gaseous medium, such as air, that contains, in addition to oxygen in excess of that needed to sustain the combustion reaction, a considerable amount of nitrogen.

To achieve the above objective, it is proposed in accordance with an advantageous feature of the present invention to operate the fuel cell device in such a manner that the reacted anode exhaust gas stream contains only a small amount of oxygen. In air/hydrocarbon fuel cells, this is achieved by operating a reformer burner, which receives the anode exhaust gas discharged from the anode side of the fuel cell device and operates to remove any unburned hydrocarbons or other fuel from the thus discharged anode exhaust gas, with an air/fuel ratio that, even though still weighted toward excess oxygen, is much closer to stoichiometric conditions that when the fuel cell device operation is optimized for electric power generation. Instead, or in addition, the oxygen content of the reformer burner exhaust gas can be reduced by reacting the residual oxygen fuel contained therein with additional fuel in an additional burner situated downstream of the fuel cell device.

Obviously, the thus treated reformer burner exhaust gas contains a high percentage of carbon dioxide. Therefore, if carbon dioxide present in the nitrogen gas is bothersome or otherwise undesirable, it may be necessary to purify the reformer burner exhaust gas after such treatment and prior to its utilization as the high-purity nitrogen gas. Moreover, the cathode and anode exhaust gases may be joined, especially in fuel cell devices operating at high pressures, before the use of the thus obtained combined fuel cell exhaust stream either directly, or after the aforementioned oxygen removal and/or purification, as the high-purity nitrogen gas. In any event, the additional recovery of nitrogen from the reacted anode exhaust gas further increases the nitrogen yield from the fuel cell device exhaust gases.

BRIEF DESCRIPTION OF THE DRAWING

The present invention will be described in more detail below with reference to the accompanying sole FIGURE of the drawing, which is a diagrammatic view of an exemplary embodiment of an apparatus in accordance with the present invention.

BEST MODE FOR CARRYING OUT THE INVENTION

Referring now to the drawing in detail, and first to FIG. 1 thereof, it may be seen that the reference numeral 10 has been used therein to identify a a fuel cell device. The fuel cell device 10 will be discussed below as being of the hydrocarbon/air type; however, it should be realized that the concepts discussed herein conjunction with this fuel cell device type are equally applicable, with some minor modifications, to other fuel cell device types as well.

The fuel cell device 10 includes, as is well known, either a single fuel cell or, more often than not, a plurality of individual fuel cells arranged in an assembly or stack. The structure and operation of such fuel cells and/or devices 10 is so well known that it need not be elaborated upon here. Suffice it to say that the fuel cell device 10 includes a cathode side 11 that is supplied with air or another gaseous oxidant through an oxidant supply conduit 13, and an anode side 12 that is supplied with a gaseous fuel through a fuel supply conduit 14.

In the illustrated exemplary embodiment utilizing the aforementioned hydrocarbon/air fuel cell device 10, cathode exhaust gas and anode exhaust gas are discharged separately from the cathode side 11 and from the anode side 12, respectively, through respective cathode and anode exhaust gas conduits 15 and 16. In this context, it is to be mentioned that, in a conventional use of the fuel cell device 10 as a generator of electric power, the exhaust gases must be safe for release into the environment, that is, the anode exhaust gas must contain no more than an insignificant amount of unburned hydrocarbons or similar fuels. For this reason, the anode exhaust gas discharged from the anode side 12 of the fuel cell device 10 is supplied to a reformer burner 17 in which the residual fuel contained in the anode exhaust gas is burned (reacted with oxygen contained in additional air supplied into the reformer burner 17), in such a manner as to virtually eliminate any unburned fuel from the reformer burner exhaust gas that is discharged into a reformer burner exhaust gas conduit 18.

Typically, this is achieved by operating the reformer burner 17 with excess oxygen, which means that the reformer burner exhaust gas discharged into the conduit 18 contains the excess oxygen. Obviously, the air that is supplied to the reformer burner 17 to furnish the needed (and excess) oxygen, and thus the reformer burner exhaust gas, contains an additional amount of gaseous nitrogen in addition to that which is contained in the cathode exhaust gas. As will be discussed later, this feature of the conventional fuel cell device construction is retained and utilized, possibly in a modified form, in the fuel cell device 10 of the present invention.

The sole Figure of the drawing also shows, in broken lines, that the fuel cell device 10 and the reformer burner 17 can be accommodated in a common housing 19, thus forming an integrated unit 20. This expedient is particularly useful in the aforementioned fuel cell devices 10 of the air/hydrocarbon type that operate at relatively high temperatures and pressures, particularly because such common housing 19 then separates the high-pressure, high-temperature components 10 and 19 of the unit 20, and any conduits connecting the same or connected thereto, from the ambient environment, thus reducing pressure and especially temperature losses. For the sake of completeness, the drawing Figure also depicts two electric leads 21 and 22 that furnish the electric power generated by the fuel cell device 10.

As already mentioned before, the fuel cell device 10 is ordinarily operated in such a manner as to maximize the electric power generation capacity thereof. This usually involves the operation of the cathode side 11 at a relatively low oxygen utilization rate, such as 60%. This, in turn, means that the cathode exhaust gas reaching the cathode gas exhaust conduit 15 still contains a relatively large percentage (such as 10%) of oxygen. This is not bothersome when the cathode exhaust gas is to be discharged into the environment; however, it usually renders the cathode exhaust gas, which amounts to about 80% of the gas throughput of the fuel cell device 10, unsuitable for use as a high-purity nitrogen gas. Yet, experience has shown that, when it is attempted to increase the degree of oxygen utilization at the cathode side 11 of the fuel cell device 10, the amount of electric power available at the leads 20 and 21 is somewhat reduced.

Now, the primary purpose to be accomplished in accordance with the present invention is the generation of high-purity nitrogen gas. This means that the electric power generation capability of the fuel cell device 10 becomes of a lesser concern. In view of the above, it is proposed in accordance with one aspect of the present invention to operate the cathode side 11 of the fuel cell device 10 in such a manner as to increase the oxygen utilization rate thereat considerably above that which has previously been considered to be necessary to efficiently operate the fuel cell device 10 in an electric power generating plant or the like. This is indicated in the sole FIGURE of the drawing in a somewhat diagrammatic fashion by the incorporation of a throttle valve 23 in the air supply conduit 13, and by an indication that this valve 23 is controlled by a control device 24. It will be realized that there is not necessarily anything new about the presence of the throttle valve 23 and/or its operation under the control of the control device 24, or about the construction of the control device 24. Rather, this aspect of the present invention is to be found in the fact that the control device 24 controls the throttle valve 23 in such a manner that the degree of oxygen utilization at the cathode side 11 of the fuel cell device 10 is increased relative to that encountered in the heretofore conventional use of the fuel cell device 10 exclusively as an electric power source.

In this context, it is to be mentioned that, in accordance with the present invention, the unit 20 is capable of producing nitrogen gas ranging from moderate to very high quality, as well as usable or salable electric power. The average market value of this nitrogen gas is very high (on the order of $2.50/MSCF) which is equivalent to a revenue of up to $0.25/kWh, approximately four to five times the revenue of the electricity produced. This creates the incentive for adapting the fuel cell device 10 for the profitable on-site generation of nitrogen for chemical, industrial, and commercial use.

Instead of, or in addition to, the aforementioned expedient of increasing the oxygen utilization rate at the cathode side 11 of the fuel cell device 10, it is also proposed in accordance with the present invention to employ an oxygen removal device 25 downstream of the cathode side 11 of the fuel cell device 10 to remove oxygen from the cathode exhaust gas discharged from the cathode side 11, with such cathode exhaust gas being supplied to the oxygen removal device 25 through a supply conduit 26. In this connection, it is to be mentioned that a break is shown in the FIGURE to exist between the conduits 15 and 26, to indicate that other conventional devices (such as a condenser that removes water vapor from the cathode exhaust gas, and/or a turbine that recovers a part of the energy contained in the cathode gas stream discharged from the cathode side 11 of the fuel cell device 10) may be present at this location.

The oxygen removal device 25 may be of any of a variety of well known constructions which need not be discussed here in detail but which are capable of removing or separating oxygen from nitrogen. However, inasmuch as at least some of the currently contemplated oxygen removal device types are capable of separating not only oxygen but also other gases or vapors, such as carbon dioxide or water vapor, from nitrogen, and since, on the other hand, the use of some other of such device types results in the introduction of carbon dioxide into the cathode exhaust stream, it would be premature to list such device types and describe their capabilities, uses and operations at this juncture. Suffice it to say that any of the device types that will be mentioned later and that is capable of removing at least oxygen from the cathode exhaust gas stream can be used for the oxygen removal device 25. Regardless of the construction of the oxygen removal device 25, however, its utilization results in a reduction in the oxygen content of the cathode exhaust gas that passes therethrough and is discharged therefrom into a nitrogen gas discharge conduit 27.

As mentioned before, the reformer burner 17 is traditionally operated, in the electric power generation scenario, in such a manner that the exhaust gas leaving the reformer burner 17 into the conduit 18 also contains, in addition to nitrogen introduced into the reformer burner 17 as constituent component of additional air that is introduced into the reformer burner 17 through an admission conduit 28, and to carbon dioxide (and other gas or vapor constituents) that is formed either in the anode side 12 of the fuel cell device 10 or in the reformer burner 17 during the reactions taking place therein, a considerable amount of oxygen. In the traditional use of the fuel cell device 10 as a source of electric power (with the reformer burner exhaust gas being eventually vented or discharged into the atmosphere), it is necessary to assure that virtually no fuel remnants be present in the reformer burner exhaust gas stream; hence, the reformer burner 17 must be operated with a relatively high amount of excess oxygen to provide such assurance, with the unreacted excess oxygen then being present in the reformer burner exhaust gas discharged into the conduit 18.

Now, in accordance with the present invention, it is contemplated to use the reformer burner exhaust gas as an additional source of the high-purity (at least low oxygen content) nitrogen gas. One way in which this can be achieved is, as also diagrammatically shown in the drawing, by incorporating another throttle valve 29 into the air admission conduit 28, and by using another control device 30 to control the operation of such throttle valve 29 in such a manner as to reduce the amount of the excess oxygen (that is, of oxygen in excess of that needed to obtain stoichiometric conditions) introduced into the reformer burner 17 to a minimum. As a result, the amount or percentage of oxygen present in the reformer burner exhaust gas will also be minimized. The use of this expedient is rendered possible by the fact that the reformer burner exhaust gas is not to be discharged into ambient air in this application.

As pointed out above, the reformer burner exhaust gas also contains, in addition to nitrogen and any residual oxygen, at least carbon dioxide (and water vapor, as well as usually a small amount of carbon monoxide). Thus, it is necessary, when the reformer burner exhaust gas is to be used as an additional source of high-purity nitrogen gas (that is, nitrogen gas containing only minimum amounts, if any, of oxygen, carbon monoxide and carbon dioxide), and regardless of whether or not the expedient presented just above is resorted to, to purify the reformer burner exhaust gas. Therefore, as depicted in the drawing, a purifying device 32 is arranged downstream of the reformer burner 17, being fed the reformer burner exhaust gas leaving the reformer burner 17 through the conduit 18 through an input conduit 33. Here again, a gap is present between the conduits 18 and 33 to indicate the presence of additional devices (such as a condenser and/or a turbine) therebetween. Once again, the purifying device 32 can be chosen from those of the device types to be mentioned below that are capable of removing at least carbon dioxide from the gas flowing through the conduit 33 into the purifying device 32, such that the purified gas that leaves the purifying device 32 through an output conduit 34 has the purity needed for the use of such gas as the high-purity nitrogen gas.

In another alternative, which is not illustrated in the drawing, the conduits 15 and 18 can be joined, advantageously within the confines of the housing 19, or the conduit 15 can be diverted to open into the reformer burner 17, with the end result that only a single, combined, exhaust gas stream is obtained. In this case, considering the fact that the combined exhaust gas stream contains not only some residual oxygen but also a considerable amount of at least carbon dioxide, it is necessary, at least when the presence of carbon dioxide in the high-purity nitrogen gas is objectionable, to pass such combined exhaust gas stream at least through the purifying device 32. In some instances, it may even be necessary or desirable to pass the combined exhaust gas stream through both the oxygen removal device 25 and the purifying device 32 arranged in series, or through a device of the type listed below that is capable of performing the functions of both of these two devices 25 and 32.

Having thus described the construction of the apparatus embodying the present inventions, the considerations underlying, and the solutions presented by, the present invention will now be discussed. As may be seen from the above explanation, the present invention is directed to the utilization of at least one of three possible fuel cell device exhaust streams as a potential source of product nitrogen. An ambient pressure fuel cell device has two exhaust streams, namely the reformer burner exhaust stream and the cathode exhaust stream. Normally, these two streams are combined within the power plant and the combined stream exits through a single water recovery condenser. However, it is possible, as contemplated by the present invention, to keep the two exhaust gas streams separate, even through this usually requires the use of two separate condensers, one for each of the streams. Then, each of the two separate exhaust gas streams has a different gas composition. The reformer burner exhaust gas, which carries about 20% of the total power plant exhaust nitrogen, contains low amounts of oxygen; the cathode exhaust gas, which carries about 80% of the total plant exhaust nitrogen, contains no carbon dioxide. In comparison, the combined exhaust gas that carries 100% of the power plant exhaust nitrogen contains moderate levels of oxygen and carbon dioxide.

In a pressurized fuel cell device, the reformer burner exhaust stream and the cathode exhaust stream are normally combined for energy recovery in a turbine. This fuel cell device thus provides a single nitrogen source, namely the combined power plant exhaust stream.

For each exhaust stream, there are specific modifications in the operation of the fuel cell device or plant which can enhance product nitrogen contents (reduce the concentration of the unwanted gases). Such fuel cell device operation modification means include techniques for reducing the oxygen contents of the exhaust gases. Oxygen in the reformer burner exhaust can be reduced by reducing the burner air to fuel ratio. Oxygen in the cathode exhaust can be reduced by increasing the cathode oxygen utilization (percent of oxygen consumed). In the combined power plant exhaust, oxygen can be reduced by higher cathode oxygen utilization and by the technique of using a portion of the oxygen depleted cathode exhaust gas along with fresh air to fire the reformer burner and then by increasing the ratio of cathode exhaust to air to reduce burner and combined power plant exhaust oxygen levels.

Each exhaust stream, whether or not modified in one or more of the above-discussed ways, can be treated by specific secondary removal processes to produce an even higher quality nitrogen product. The type of the secondary process or processes that is or are used to treat the respective exhaust gas is determined by the composition of the exhaust gas in question, on the one hand, and the desired and obtainable composition of the high-purity nitrogen gas.

One secondary means of purifying exhaust product gas is the use of a regenerable solvent to adsorb carbon dioxide using a contact tower. The solvent is continuously regenerated by depressurization or by air stripping to evolve dissolved carbon dioxide. The Selexol process, which is air compatible, is a good example of this process. Carbon dioxide recovered by depressurization of the solvent can be recovered as a by-product of this process.

Carbon dioxide, along with oxygen and water vapor can also be removed from nitrogen by the pressure swing adsorption process which switches adsorbent beds between adsorption (pressurized) and desorption (depressurized) cycles. Pressure swing adsorption with activated carbon beds results in the adsorption of carbon dioxide, oxygen and water vapor, resulting in a purified exit nitrogen stream. Switching the bed to the depressurization mode evolves the carbon dioxide, oxygen and water vapor. By-product carbon dioxide may also be recovered in this process.

Pressurized polymer membranes can also be used to remove carbon dioxide, oxygen and water vapor from the exhaust stream. Under pressure, "fast" gases such as carbon dioxide, oxygen and water vapor, permeate through the membrane, leaving a purified nitrogen product gas. The Monsanto Prism separator is a good example of this process.

The level of oxygen can be reduced by a thermal process called reburning. Additional fuel can be added to the fuel cell exhaust gas and burned in a catalytic burner to reduce the exhaust stream oxygen content. Typically, with the fuel cell device 10 operating at 60% cathode oxygen utilization, about 50% additional fuel must be burned to ultimately achieve 1% oxygen concentration. Heat generated in the process can be recovered as cogeneration heat. Carbon dioxide generated by burning a hydrocarbon fuel can be recovered by a regenerable carbon dioxide solvent process such as a Selexol process.

Electrochemical means can also be used to remove oxygen from the exhaust stream. If the exhaust gas is pressurized and fed to a second fuel cell, additional oxygen can be utilized and removed from the stream. Up to 60 to 80% additional oxygen can be removed. The exhaust gas can also be fed to an electrochemical oxygen transfer device where an applied electrical voltage will cause oxygen to transfer from the exhaust electrode to an oxygen evolving electrode. A polymer exchange membrane (PEM) cell can be used for this transfer process. Up to 60 to 80% of the oxygen can be removed by this technique.

All of the above-discussed secondary purification and/or oxygen removal devices are of well known constructions that need not be explained here.

The following Tables I, II and III list the fuel cell operation modification means and all the secondary devices for enhancing fuel cell exhaust nitrogen contents and producing higher quality nitrogen gas from the cathode exhaust gas, the reformer burner exhaust gas and the combined power plant exhaust gas, respectively, and the effect of such means on the nitrogen gas quality.

TABLE I

NITROGEN PRODUCTION FROM CATHODE EXHAUST GAS

| | Nominal Achievable Levels (% dry) | | |
|---|---|---|---|
| | $O_2$ | $CO_2$ | $N_2$ |
| Fuel Cell Operation | | | |
| Baseline | 10 | — | 90 |
| Increased Cathode Oxygen Utilization | 4–6 | — | 94–96 |
| Secondary Means | | | |
| Second Fuel Cell | 1–3 | — | 97–99 |
| Electrochemical Oxygen Transfer Device | 1–3 | — | 97–99 |
| Reburning with Additional Fuel and Subsequent $CO_2$ Removal by Regenerable Solvent | 1 | 0.1 max | 99 |
| $O_2$, $H_2O$ Removal by Pressure Swing Absorption | 0.1 | | 99.9 |
| $O_2$, $H_2O$ Removal by Polymer Membrane | 0.1 | | 99.9 |

TABLE II

NITROGEN FROM REFORMER BURNER EXHAUST GAS

| | Nominal Achievable Levels (% dry) | | |
|---|---|---|---|
| | $O_2$ | $CO_2$ | $N_2$ |
| Fuel Cell Operation | | | |
| Baseline | 3 | 28 | 69 |
| Reduced Reformer Burner Air to Fuel Ratio | 1–2 | 28 | 70–71 |
| Secondary Means | | | |
| $CO_2$ Removal by Regenerable Solvent | 1.4–4 | 0.1 | 96–97.5 |
| $CO_2$, $O_2$, $H_2O$ Removal by Pressure Swing Absorption | 0.1 | | 99.9 |
| $CO_2$, $O_2$, $H_2O$ Removal by Polymer Membrane | 0.1 | | 99.9 |

TABLE III

NITROGEN PRODUCTION FROM COMBINED EXHAUST GAS

| | Nominal Achievable Levels (% dry) | | |
|---|---|---|---|
| | $O_2$ | $CO_2$ | $N_2$ |
| Fuel Cell Operation | | | |
| Baseline | 7–8 | 7–9 | 83–86 |
| Increased Cathode Exhaust Gas Burning in Reformer Burner | 5–6 | 7–9 | 85–88 |
| Increased Cathode Oxygen Utilization | 4–5 | 7–9 | 86–89 |
| Secondary Means | | | |
| $CO_2$ Removal by Reenerable Solvent and $O_2$ Removal by Second Fuel Cell | 1–3 | 0.1 | 97–99 |
| $CO_2$ Removal by Reenerable Solvent and $O_2$ Removal by Electrochemical Oxygen Transfer Device | 1–3 | 0.1 | 97–99 |
| Reburning with Additional Fuel and Subsequent $CO_2$ Removal by Regenerable Solvent | 1 | 0.1 | 99 |
| $CO_2$, $O_2$, $H_2O$ Removal by Pressure Swing Absorption | 0.1 | | 99.9 |
| $CO_2$, $O_2$, $H_2O$ Removal by Polymer Membrane | 0.1 | | 99.9 |

While the present invention has been illustrated and described as embodied in a particular construction of a fuel cell apparatus equipped with particular means for improving the nitrogen content of the fuel cell exhaust gas or gases and further enhancing the nitrogen product quality by various carbon dioxide and oxygen removal means, it will be appreciated that the present invention is not limited to these particular examples; rather, the scope of protection of the present invention is to be determined solely from the attached claims.

We claim:

1. A method of generating high-purity nitrogen gas, comprising the steps of
    operating a fuel cell device having a cathod side and an anode side, including the sub-steps of
        passing an air stream through the cathode side of the fuel cell device,
        feeding a gaseous fuel stream to the anode side of the fuel cell device, and
        electrochemically combining oxygen from the air stream in the fuel cell device with fuel from the fuel stream, with attendent formation of a cathode exhaust gas stream containing nitrogen and residual oxygen, and generation of electric power;
    controlling said passing step; and reducing at least the residual oxygen content of the cathode exhaust gas stream to a level at which the cathode exhaust gas constitutes the high-purity nitrogen gas, including at least one of the sub-steps of performing said controlling step in such a manner as to optimize the oxygen utilization at the cathode side of the fuel cell device even at the expense of reducing the amount of electric power generated relative to the optimum electric power generation operating conditions of the fuel cell device, and removing most of the residual oxygen from the cathode exhaust gas stream exhausted from the cathode side of the fuel cell device, while maintaining both oxygen and nitrogen contained in the cathode exhaust gas in their gaseous states throughout.

2. The method as defined in claim 1, wherein said operating step further includes the sub-steps of discharging an anode exhaust gas stream from the anode side after the performance of said electrochemically combining sub-step, and reacting residual fuel that is contained in the anode exhaust gas stream with a gaseous medium containing nitrogen and oxygen; and further comprising at least one of the sub-steps of adjusting the amount of the oxygen used in said reacting sub-step in such a manner as to reduce the oxygen/fuel ratio to close to the stoichiometric level relative to that used when the fuel cell device is operated under said optimum electric power generation operating conditions, and purifying the reacted anode exhaust gas stream subsequent to said reacting sub-step.

3. The method as defined in claim 2, and further comprising the step of joining the cathode and reacted anode exhaust gases to form a combined fuel cell exhaust gas stream.

* * * * *